United States Patent [19]

Moon

[11]  4,411,563

[45]  Oct. 25, 1983

[54] CUTTER DEVICE

[76] Inventor: Elwood Moon, Cemetery Dr., Watsontown, Pa.

[21] Appl. No.: 288,904

[22] Filed: Jul. 31, 1981

[51] Int. Cl.³ ............................................. B23B 51/02
[52] U.S. Cl. .................................. 407/54; 76/108 R; 408/224; 408/230
[58] Field of Search ...................... 408/224, 225, 230; 76/108 R, 108 T; 407/37, 38, 39, 53, 54

[56] References Cited

U.S. PATENT DOCUMENTS

| | | | |
|---|---|---|---|
| 2,129,417 | 9/1938 | Gase | 407/54 |
| 2,389,909 | 11/1945 | Hafbauer | 408/224 |
| 3,456,316 | 7/1969 | Dawson | 407/53 |
| 3,737,245 | 6/1973 | Mater | 408/225 |
| 3,811,163 | 5/1974 | Frederick et al. | 407/54 |
| 3,977,807 | 8/1976 | Siddall | 408/230 |

FOREIGN PATENT DOCUMENTS 24847 of 0000 Japan ...................... 407/53

*Primary Examiner*—W. D. Bray

[57] ABSTRACT

A cutter device for use in end milling, or profile cutting or combined end milling and profile cutting operations having an elongated tool body with an elongated flute section and an exposed end. A first plurality of cutting flutes, which are spiral shaped, are integral with and extend outwardly from the surface of the flute section. The flutes in the first pair are equidistantly spaced apart and define a first outer diameter. The first plurality of flutes extends along said surface from a point intermediate the ends of the tool body to a first end position on the exposed end. The first plurality of flutes in said first end position defines a first set of cutting blades lying in a first plane of cut for end milling. A second plurality of cutting flutes, which are spiral shaped, are integral with and extend outwardly from the surface beyond the first pair of flutes. The flutes in said second plurality are spaced apart and define a second outer diameter which is larger than said first diameter. The flutes in said pluralities are interleaved. The second plurality of flutes is usable for profile cutting and extends along said surface from said intermediate point to a second end position on said exposed end. The second plurality of flutes in said second end position defines a second set of cutting blades lying in a second plane of cut for end milling. The first plane of cut lies below said second plane of cut when the body is disposed vertically with the exposed end pointing downward.

5 Claims, 12 Drawing Figures

CUTTER DEVICE

BACKGROUND OF THE INVENTION

When end milling operations require the use of cutting tools having different outer diameters, it is customary to use two end mills each having a tool with a different diameter or to use one mill, using first one tool and then a different tool. Similarly, several machines using tools of different outer diameters are used to cut a profile when the process calls for more than one outer diameter setting.

This invention overcomes these difficulties by providing a new type of tool, a cutter device which enables the user to use two or more outer diameters simultaneously in one end milling machine or to use two or more diameter settings sequentially in one machine while cutting profiles or to carry out combined operations of end milling and profile cutting without changing tools.

SUMMARY OF THE INVENTION

In accordance with the principles of this invention, a cutter device is disclosed which can be used in end milling or in profile cutting or in combined end milling and profile cutting operations while overcoming the difficulties set forth above. The device has an elongated tool body with an elongated flute section having an exposed end. A first plurality of cutting flutes, spiral shaped and integral with the section extends outwardly from the surface of the section. The flutes in the first plurality are equidistantly spaced apart and define a first outer diameter. The first plurality of flutes extends along said surface from a point intermediate the ends of the body to a first end position on the exposed end of the section. The first plurality of flutes in said first end position defines a first set of cutting blades lying in a first plane of cut for end milling. A second plurality of cutting flutes, spiral shaped and integral with the section, extends outwardly from said surface beyond the first pair of flutes. The flutes in said second plurality are equidistantly spaced apart and define a second outer diameter which is larger than said first diameter. The flutes in said pluralities are interleaved. The second plurality of flutes is usable for profile cutting and extends along said surface from said intermediate point to a second end position on said exposed end. The second plurality of flutes in the second position define a second set of cutting blades lying in a second plane of cut for end milling.

While the body can be disposed in any position, the first plane of cut lies below the second plane of cut when the body is disposed vertically with the exposed end pointing downward.

If desired the body can be provided with a third plurality of flutes which are also spiral shaped, integral with the section, and interleaved with the other flutes. The flutes in the third plurality will be equidistantly spaced apart and will define a third diameter which is larger than the second diameter. The third plurality of flutes is usable for profile cutting and extends along the surface of the section from the intermediate point to a third end position on the exposed end. The third pair of flutes in the third position define a third set of cutting blades lying in a third plane of cut for end milling. The third plane of cut ends above the second plane of cut when the body is disposed vertically with the exposed end pointing downward.

Similarly the body can be provided with a fourth plurality of flutes which are also spiral shaped, integral with the section and interleaved with all the other pluralities of flutes. The flutes in the fourth plurality will be equidistantly spaced apart and will define a fourth diameter which is larger than the third diameter. The fourth plurality of flutes is usable for profile cutting and extends along the surface of the shank from the intermediate point to a fourth end position on the exposed end. The fourth plurality of flutes in the fourth position define a fourth set of cutting blades lying in a fourth plane of cut for end milling. The fourth plane of cut ends above the third plane of cut when the body is disposed vertically with the exposed end pointing downward.

Thus the cutter device has two, three or four outer diameters. The flute geometry is otherwise similar to that of the conventional tool although the relief angles can vary from flute to flute to control chatter where varying amounts of stock are being cut at different surface speeds and rates of feed. The smallest diameter flute extends beyond all others in end projection. All other flutes are arranged in order of the size of their diameters with the smaller diameter extending beyond the larger diameter in end projection.

This cutter device offers constant cutting on more than one outer diameter simultaneously with the same end mill, eliminating the cost of several tools or the use of several machines to cut a profile where conventional process would call for more than one outer diameter setting. Down time for tool service or resharpening is minimized, since neither rework on the tool nor recalculation on the machine is required to maintain the outer diameter setting, because the cutter device is sharpened on end faces only and the machine setting of the axis relative to the tool outer diameter remains constant for the life of the tool and all subsequent tools with the same flute geometry. This factor is especially favorable to machinery operations where end mills are preset on end for face location.

Each plurality is at least equal to two and cannot exceed six because the cutter typically will have a total of four, six or eight flutes. When a plurality of two flutes is employed, these flutes will be oppositely disposed. When the plurality is equal to three or four flutes, these flutes are symmetrically arranged. In all cases, however, the flutes in any plurality are equidistantly spaced from each other. This type of spacing is required to balance the pressure on cutting.

The use of three, four or six flutes in any selected plurality may be required when a finer resultant surface is required on one or more diameters of the profile being cut on the workpiece than would be obtained when only two flutes are employed.

DETAILED DESCRIPTION OF PREFERRED EMBODIMENTS

Figure 1A:
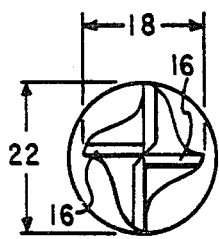
FIGS. 1A, 1B and 1C respectively illustrate an end view, planes of cut and a side view of a four flute section cutter device in accordance with the invention which employs first and second pairs of flutes.
Figure 1B:
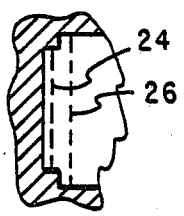
Figure 1C:
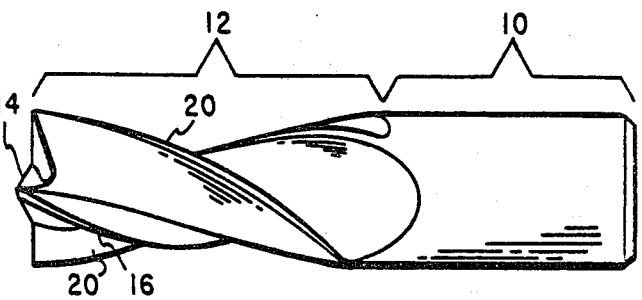

Referring first to FIGS. 1A, 1B and 1C, the cutter device is an elongated body having a shank 10, and a flute section 12 having an exposed end 14. A first pair of oppositely disposed flutes 16 defines a first outer diameter 18 and a second pair of opposed flutes 20 defines a second and larger diameter 22. The first plane of cut of the flutes 18 is shown as dotted line 24 and the second plane of cut of the flutes 10 is shown as dotted line 26.

Figure 2A:
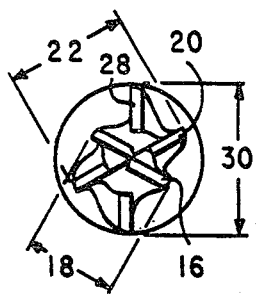
FIGS. 2A, 2B and 2C respectively illustrate an end view, planes of cut and a side view of a six flute section cutter device in accordance with the invention which employs first, second and third pairs of flutes.
Figure 2B:
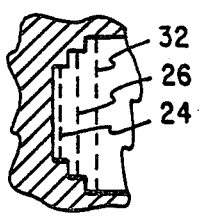
Figure 2C:
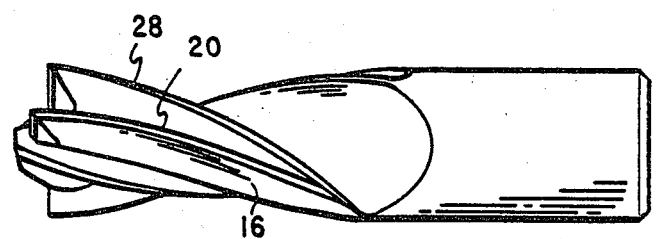

Referring next to FIGS. 2A, 2B and 2C, the first pair of flutes 16 defines a first outer diameter 28 with a first plane of cut 24; the second pair of flutes 20 defines a second and larger outer diameter 22 with a second plane of cut 26. A third pair of flutes 28 defines a third and still larger diameter 30 and has a third plane of cut shown as dotted line 32.

Figure 3A:
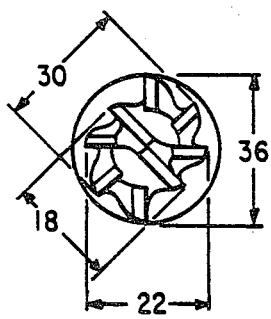
FIGS. 3A, 3B and 3C respectively illustrate an end view, planes of cut and a side view of an eight flute section cutter device in accordance with the invention which employs first, second, third and fourth pairs of flutes.
Figure 3B:
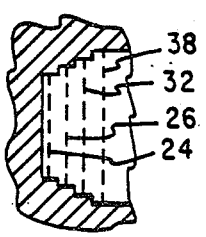
Figure 3C:
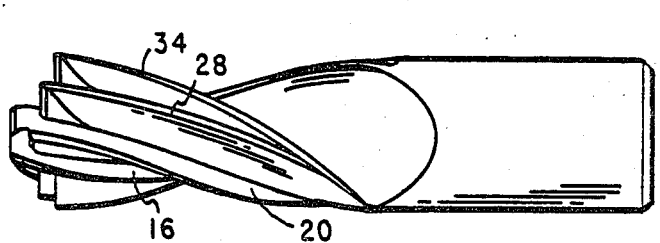

Referring next to FIGS. 3A, 3B and 3C, the first pair of flutes 16 define a first outer diameter 18 with a first plane of cut 24; the second pair of flutes 20 define a second outer diameter 22 with a second plane of cut 26; the third pair of flutes 28 defines a third diameter 30 with a third plane of cut 32. A fourth pair of flutes 34 defines a fourth and still larger diameter 36 and has a fourth plane of cut shown as dotted line 38.

Figure 4:
FIG. 4 is an end view of another six flute section cutter device which employs a first plurality of three flutes and a second plurality of three flutes.

FIG. 4 is an end view showing three symmetrically disposed flutes 16 defining a first outer diameter 18 and three symmetrically disposed flutes 20 defining a second diameter 22. The planes of cut are the same as shown in FIG. 1B but two finer resultant surfaces are obtained when the three flute groups of FIG. 4 are used in place of the pair of flutes of FIGS. 1A and 1C.

Figure 5:
FIG. 5 is an end of yet another six flute section cutter device which employs a first plurality of four flutes and a second plurality of two flutes.

FIG. 5 is an end view showing four symmetrically disposed flutes 16 collectively defining a first outer diameter 18 and two symmetrically disposed flutes 20 defining a second and larger outer diameter 22. The planes of cut are the same as shown in FIG. 1B, but a finer resultant surface is obtained when the four flutes 16 of FIG. 5 are used instead of the two flutes 16 of FIGS. 1A and 1C.

Figure 6:
FIG. 6 is an end view of another eight flute section cutter device which employs a first plurality of four flutes, a second plurality of two flutes and a third plurality of two flutes.

FIG. 6 is an end view showing four symmetrically disposed flutes 16 defining a first diameter 18; two oppositely disposed flutes 20 defining a second diameter 22; and two oppositely disposed flutes 28 defining a third diameter 30. The planes of cut are the same as shown in FIG. 2B, but a finer resultant surface is obtained when the four flutes 16 of FIG. 6 are used in place of the two flutes 16 of FIGS. 2A and 2C.

What is claimed is:

1. A cutter device for use in end milling or profile cutting or combined end milling and profile cutting operations, said device comprising:

an elongated tool body having an elongated flute section having an exposed end;

a first plurality of cutting flutes which are spiral shaped and which are integral with and extend outwardly from the surface of the section, the flutes in the first plurality being equidistantly spaced apart to define a first uniform outer diameter, the first plurality of flutes extending along said surface from a point intermediate the ends of the body to a first end position on said exposed end, said first plurality of flutes in said first end position defining a first set of cutting blades lying in a first plane of cut for end milling; and a second plurality of cutting flutes which are spiral shaped and which are integral with and extend outwardly from said surface beyond the first plurality of flutes, the flutes in said second plurality being equidistantly spaced apart to define a second uniform outer diameter which is larger than said first diameter, the flutes in all of said pluralities being interleaved, the second plurality of flutes being usable for profile cutting and extending along said surface from said intermediate point to a second end position on said exposed end, said second plurality of flutes in said second end position defining a second set of cutting blades lying in a second plane of cut for end milling, said first plane of cut lying below said second plane of cut when the body is disposed vertically with the exposed end pointing downward.

2. The device of claim 1 wherein each of said pluralities is at least equal to two and does not exceed six.

3. The device of claim 2 further including a third plurality of cutting flutes which are spiral shaped and which are integral with and extend outwardly from said surface beyond said second plurality of flutes, the flutes in said third plurality being equidistantly spaced apart to define a third uniform outer diameter which is larger than said second diameter, the flutes in all of said pluralities being interleaved, the third plurality of flutes being usable for profile cutting and extending along said surface from said intermediate point to a third end position on said exposed end, said third plurality of flutes being at least equal to two and not exceeding four and in said third end position defining a third set of cutting blades lying in a third plane of cut for end milling, said second plane of cut lying below said third plane of cut when the body is disposed vertically with the exposed end pointing downward.

4. The device of claim 3 wherein each of said first, second and third pluralities is equal to two.

5. The device of claim 4 further including a fourth plurality of cutting flutes wherein said fourth plurality is equal to two, said fourth plurality of flutes being spiral shaped and being integral with and extending outwardly from said surface beyond said third plurality of flutes, the flutes in said fourth plurality being equidistantly spaced apart to define a fourth uniform outer diameter which is larger than said third diameter, the flutes in all of said pluralities being interleaved, the fourth plurality of flutes being usable for profile cutting and extending along said surface from said intermediate point to a fourth end position on said exposed end, said fourth plurality of flutes being usable for profile cutting and extending along said surface from said intermediate point to a fourth end position on said exposed end, said fourth plurality of flutes in said fourth end position defining a fourth set of cutting blades lying in a fourth plane of cut for end milling, said third plane of cut lying below said fourth plane of cut when the body is disposed vertically with the selected end pointing downward.

* * * * *